US009771897B2

(12) United States Patent
Soulier et al.

(10) Patent No.: US 9,771,897 B2
(45) Date of Patent: Sep. 26, 2017

(54) JET PROPULSION DEVICE AND FUEL SUPPLY METHOD

(71) Applicant: SNECMA, Paris (FR)

(72) Inventors: Nicolas Soulier, Fontaine Bellenger (FR); Bruno Brochard, Houlbec Cocherel (FR); Jean-Michel Sannino, Saint-Marcel (FR)

(73) Assignee: SNECMA, Paris (FR)

( * ) Notice: Subject to any disclaimer, the term of this patent is extended or adjusted under 35 U.S.C. 154(b) by 713 days.

(21) Appl. No.: 14/350,980

(22) PCT Filed: Oct. 8, 2012

(86) PCT No.: PCT/FR2012/052278
§ 371 (c)(1),
(2) Date: Apr. 10, 2014

(87) PCT Pub. No.: WO2013/054027
PCT Pub. Date: Apr. 18, 2013

(65) Prior Publication Data
US 2014/0260181 A1 Sep. 18, 2014

(30) Foreign Application Priority Data

Oct. 11, 2011 (FR) ..................................... 11 59177

(51) Int. Cl.
*F02K 9/48* (2006.01)
*F02K 9/64* (2006.01)
(Continued)

(52) U.S. Cl.
CPC ................ *F02K 9/48* (2013.01); *B64G 1/002* (2013.01); *F02K 9/64* (2013.01); *F02K 9/88* (2013.01)

(58) Field of Classification Search
CPC ..... F02K 9/46; F02K 9/48; F02K 9/50; F02K 9/62; F02K 9/64; F02K 9/74; F02K 9/76;
(Continued)

(56) References Cited

U.S. PATENT DOCUMENTS 3,102,388 A * 9/1963 Abild ........................ F02K 9/50
60/224
3,541,793 A 11/1970 Schmidt
(Continued)

FOREIGN PATENT DOCUMENTS

EP 2 103 799 9/2009
FR 2 031 047 11/1970
(Continued)

OTHER PUBLICATIONS

Buckmann, et al. "Design and Test of an Oxygen Turbopump for a Dual Expender Cycle Rocket Engine" Journal of Propulsion and Power, vol. 8, No. 1, pp. 80-86, Jan./Feb. 1992 XP 000244087.
(Continued)

*Primary Examiner* — Carlos A Rivera
*Assistant Examiner* — Marc Amar
(74) *Attorney, Agent, or Firm* — Oblon, McClelland, Maier & Neustadt, L.L.P.

(57) ABSTRACT

A reaction propulsion device in which a first feed circuit for feeding a main thruster with a first propellant includes a branch connection downstream from a pump of a first turbopump, which branch connection passes through a first regenerative heat exchanger and a turbine of a first turbopump, and in which a second feed circuit for feeding the main thruster with a second propellant includes, downstream from a pump of a second turbopump, a branch-off passing through a second regenerative heat exchanger and a turbine
(Continued)

of the second turbopump. At least one secondary thruster is connected downstream from the turbines of the first and second turbopumps.

10 Claims, 1 Drawing Sheet

(51) Int. Cl.
   *F02K 9/88* (2006.01)
   *B64G 1/00* (2006.01)
(58) Field of Classification Search
   CPC . F02K 9/766; F02K 9/88; F02K 9/972; B64G 1/401; B64G 1/402
   See application file for complete search history.

(56) References Cited

U.S. PATENT DOCUMENTS

| | | | | |
|---|---|---|---|---|
| 3,788,069 A | * | 1/1974 | Schmidt | F02K 9/48 60/207 |
| 4,771,599 A | * | 9/1988 | Brown | F02K 9/42 239/419.3 |
| 5,444,973 A | * | 8/1995 | Limerick | B64G 1/401 60/204 |
| 2009/0235639 A1 | * | 9/2009 | Kimura | F02K 9/48 60/246 |
| 2012/0198813 A1 | * | 8/2012 | Gregory | F02K 9/48 60/204 |
| 2014/0203148 A1 | * | 7/2014 | Barthoulot | F02K 9/50 244/171.1 |

FOREIGN PATENT DOCUMENTS

| | | | | |
|---|---|---|---|---|
| FR | 2 531 141 | | 2/1984 | |
| GB | 1 210 601 | | 10/1970 | |
| GB | 1320766 A | * | 6/1973 | F02K 9/44 |
| RU | 2 040 703 | | 7/1995 | |

OTHER PUBLICATIONS

International Search Report Issued Jan. 31, 2013 in PCT/FR12/052278 Filed Oct. 8, 2012.

* cited by examiner

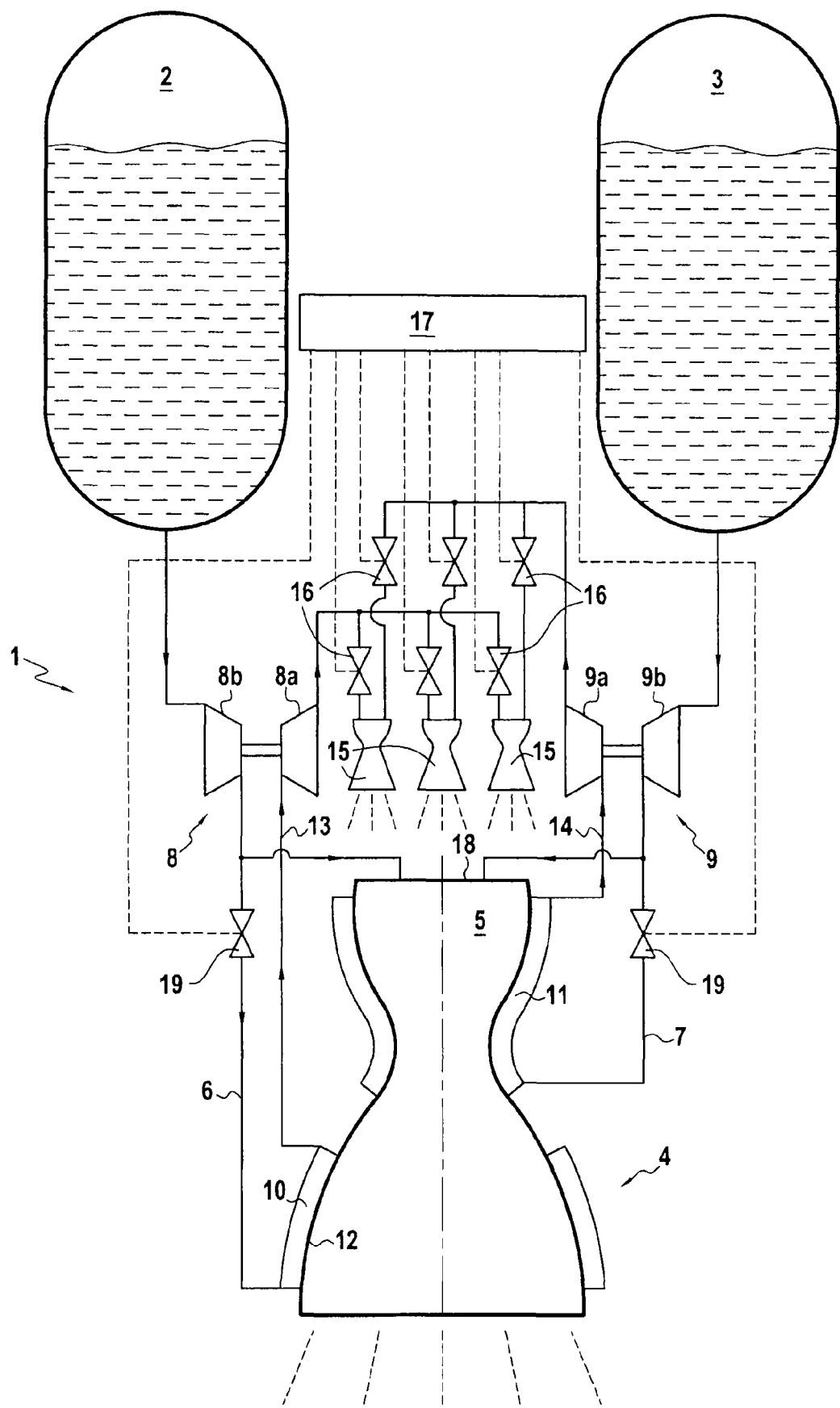

JET PROPULSION DEVICE AND FUEL SUPPLY METHOD

BACKGROUND OF THE INVENTION

The present invention relates to the field of reaction propulsion devices, and in particular to two-propellant reaction propulsion devices, i.e. in particular rocket engines.

In the description below, the terms "upstream" and "downstream" are defined relative to the normal flow directions of the propellants in the propellant feed circuit of the reaction propulsion device.

Since the beginning of the space age, one of the main technical problems has been to ensure that thrusters are fed with propellants. Although the use of liquid propellants makes it possible to achieve controlled operation of a thruster, which does not apply with solid propellants, such liquid propellants normally need to be injected at high pressure into a propulsion chamber in order to overcome the pressure that exists inside it while the thruster is in operation. So long as the pressure inside the propulsion chamber is not too high, that can be done in comparatively simple manner by pressurizing the propellant tank. Nevertheless, if it is desired to increase the specific thrust of the thruster, it is necessary to increase the pressure inside the propulsion chamber above the pressures that can normally be achieved by pressurizing tanks. It is therefore common practice to use turbopumps to feed the propulsion chamber with propellants at very high pressure. Such a turbopump normally comprises at least one pump and at least one turbine coupled to the pump, with the pump being driven by expanding gas through the turbine. Various arrangements have been proposed for turbopumps. Thus, in certain arrangements, a single turbine drives two pumps, one for each propellant, directly or via gearing. In other arrangements, each propellant is driven by a separate turbopump. Typically, the expanding gas used for actuating the turbopump(s) comes from a gas generator, and in particular a gas generator that is also fed with propellants.

Nevertheless, that solution also presents certain drawbacks. In particular, since the propellants are highly reactive, it is generally necessary in each turbopump to isolate the combustion gas from at least one of the propellants. In particular when one of the propellants is a highly oxidizing liquid, such as liquid oxygen, for example, it is important to ensure that the flow of liquid oxygen is reliably separated from the combustion gas produced by the gas generator, since that gas is normally slightly reducing.

In such reaction propulsion devices, it is also common practice to use regenerative propulsion chambers having heat exchangers incorporated therein through which at least one of the liquid propellants passes for the purpose of cooling the walls of the propulsion chamber while preheating at least a portion of the propellant. Proposals have thus been made to make use, downstream from these heat exchangers, of the expansion of at least one propellant as preheated in this way to drive the feed turbopump(s).

French patent FR 2 031 047 thus discloses a reaction propulsion device comprising a main thruster with a propulsion chamber, a first feed circuit with a first turbopump comprising a turbine coupled to a pump in order to deliver a first propellant to the propulsion chamber of the main thruster, and a second feed circuit with a second turbopump likewise comprising a turbine coupled to a pump to deliver a second propellant to the propulsion chamber of the main thruster with a second propellant. The propulsion chamber of the main thruster is a regenerative propulsion chamber, including a first heat exchanger and a second heat exchanger.

In that prior art device, the first feed circuit passes, downstream from the first heat exchanger, through the turbine of the first turbopump, and the second feed circuit passes, downstream from the second heat exchanger, through the turbine of the second turbopump. Thus, each of the propellants is pumped to the propulsion chamber of the main thruster by a pump that is driven by a turbine actuated by expansion of the same propellant. There is therefore no need to guarantee complete separation between the pump and the turbine in each turbopump.

Nevertheless, in that prior art device, since all of the flow of each of the two propellants is expanded through the turbine of the corresponding turbopump prior to being injected into the propulsion chamber, the injection pressure and thus the pressure in the propulsion chamber and also the specific thrust remain limited.

OBJECT AND SUMMARY OF THE INVENTION

The present invention seeks to remedy those drawbacks. In at least one embodiment of the invention, this object is achieved by the fact that the first feed circuit presents, downstream from the pump of the first turbopump, a branch-off through the first heat exchanger and the turbine of the first turbopump, and the second feed circuit presents, downstream from the pump of the second turbopump, a branch-off through the second heat exchanger and the turbine of the second turbopump; and by the fact that it also includes at least one secondary thruster connected to said branch-offs downstream from the turbines of the first and second turbopumps. Thus, instead of expanding the entire flow of both propellants in order to drive the turbopumps, only a secondary flow of each propellant is used for actuating the corresponding turbopump prior to being delivered to one or more secondary thrusters. The main flow of each propellant can thus be delivered directly to the propulsion chamber at high pressure, whereas in the turbines of the two turbopumps, the secondary flows of the two propellants may be expanded to a pressure that is significantly lower, since the at least one secondary thruster, which may for example be a vernier type steering control thruster, does not necessarily need to reach very high specific thrust.

In particular, and not only when said at least one secondary thruster is a steering control thruster, the propulsion device may include valves interposed between said turbines and said at least one secondary thruster, thereby enabling the propellant feed of said at least one secondary thruster to be controlled, and thus enabling its thrust to be controlled. Also under such circumstances, the thruster device may have a plurality of secondary thrusters connected downstream from the turbines of the first and second turbopumps, in particular for the purpose of generating thrust along a plurality of distinct axes. Nevertheless, as an alternative or in addition to valves situated between the turbines and said at least one secondary thruster, each branch-off may also include a valve situated upstream from the corresponding heat exchanger, thus enabling the entry of propellant into said branch-offs to be controlled.

Furthermore, in at least certain embodiments, said first heat exchanger and/or said second heat exchanger may be incorporated in an outer wall of said propulsion chamber. In particular, the first and/or second heat exchanger incorporated in the outer wall of the propulsion chamber includes at least one propellant duct adjacent to an outer side of said wall, thus making it easier to exchange heat between the outer wall of the propulsion chamber and the propellants passing through the heat exchanger, while limiting the weight and the complexity of the heat exchanger.

The present invention also provides a space launcher including at least one such reaction propulsion device, even though the device may also be used for propelling other types of aviation and/or space vehicle.

The present invention also provides a method of feeding propellants to a reaction propulsion device. In at least one implementation of this method, it comprises the following steps: delivering a main flow of a first propellant to a propulsion chamber of a main thruster via a first feed circuit in which the first propellant is pumped by a pump of a first turbopump, and also delivering a main flow of a second propellant to the propulsion chamber of the main thruster via a second feed circuit in which the second propellant is pumped by a pump of a second turbopump; diverting a secondary flow of the first propellant from the main flow of the first propellant, downstream from the pump of the first turbopump, heating it by means of the propulsion chamber of the main thruster in a first heat exchanger, and expanding it in a turbine driving the first turbopump; and diverting a secondary flow of the second propellant from the main flow of the second propellant, downstream from the pump of the second turbopump, heating it by means of the propulsion chamber of the main thruster in a second heat exchanger, and expanding it in a turbine driving the second turbopump. Finally, the method includes the step of delivering said secondary flows of the first and second propellants, after they have expanded in the turbines of the first and second turbopumps to at least one secondary thruster.

Thrust from said at least one secondary thruster may be used in particular for steering, thus making it possible to direct the path followed by a vehicle propelled by the device while it is in operation. In particular, and not only under such circumstances, the propellant flow rate delivered to each secondary thruster may be controlled by valves interposed between said turbines and said at least one secondary thruster. Alternatively or in addition to this individual control of flow rate downstream from the turbines, said secondary flows may also be controlled by valves situated upstream from the heat exchangers.

In order to obtain particularly high effectiveness for the cooling of the outer wall of the chamber, said first and/or second propellants may be liquid upstream from the first and/or second heat exchanger, and gaseous downstream therefrom. This vaporization of the propellant in the heat exchanger also presents the advantage of increasing the power that can be extracted from the flow of propellant by its expansion in the turbine downstream.

BRIEF DESCRIPTION OF THE DRAWING

The invention can be well understood and its advantages appear better on reading the following detailed description of an embodiment given by way of non-limiting example. The reference refers to accompanying FIG. 1, which is a diagram showing a reaction propulsion device in an embodiment of the invention.

DETAILED DESCRIPTION OF THE INVENTION

FIG. 1 shows a reaction propulsion device 1 in an embodiment of the invention, which device is fed with liquid propellants from two tanks 2 and 3 that respectively contain first and second propellants (e.g. liquid hydrogen and liquid oxygen). The device 1 comprises a main thruster 4 with a propulsion chamber 5, a first feed circuit 6 connected to the first tank 2 and to the propulsion chamber 5 in order to deliver the first propellant to the propulsion chamber 5, and a second feed circuit 7 connected to the second tank 3 and to the propulsion chamber 5 in order to deliver the second propellant to the propulsion chamber 5. The first feed circuit 6 has a first turbopump 8 having a turbine 8a coupled to a pump 8b. The second feed circuit 7 has a second turbopump 9 separated from the first turbopump 8 and likewise comprising a turbine 9a coupled to a pump 9b. The propulsion chamber 5 is a regenerative propulsion chamber having a first heat exchanger 10 and a second heat exchanger 11. By way of example, these first and second heat exchangers 10 and 11 may be formed by propellant ducts wound around an outer wall 12 of the propulsion chamber 5 and/or by coils incorporated in said outer wall 12.

Downstream from the pump 8b, the first feed circuit 6 has a branch-off 13 passing through the first heat exchanger 10 and the turbine 8a, while downstream from the pump 9b, the second feed circuit 7 presents a branch-off 14 passing through the second heat exchanger 11 and the turbine 9a of the second turbopump 9. In addition, the device 1 has a plurality of secondary thrusters 15, each connected to said branch-offs 13, 14 downstream from said turbines 9a, 9b via control valves 16. Other control valves 19 are situated upstream from the heat exchangers 10, 11 so as to make it possible to control the secondary flow rates passing via the branch-offs 13, 14. The secondary thrusters 15 may be directed along axes that are different and/or steerable, so as to be capable of acting as vernier thrusters for controlling the orientation of a vehicle propelled by the device 1. For this purpose, the valves 16, 19 may also be connected, as shown, to a control unit 17 suitable for receiving external commands, and signals from sensors for sensing speed, position, acceleration, and/or orientation, for example, in order to control the secondary thrusters 15.

In operation, a main flow of the first propellant is pumped by the pump 8b through the first feed circuit 6, from the first tank 2 to an injection plate 18 of the propulsion chamber 5. A main flow of the second propellant is pumped by the pump 9b through the second feed circuit 7 from the second tank 3 to the injection plate 18. Both propellants are thus injected into the propulsion chamber 5 through the injection plate 18, and the reaction between them inside this chamber produces hot gas that, on expanding in the nozzle of the propulsion chamber 5, generates the thrust of the main thruster 4. Whereas the main flow of each of the propellants is injected into the propulsion chamber 5, a secondary flow of each propellant, as controlled by the valves 19, is diverted to the branch-offs 13, 14 to flow through the heat exchangers 10, 11, vaporizes in the heat exchangers 10, 11, and is then fed in the gaseous state to the turbines 8a, 9a so as to drive the pumps 8b, 9b by expanding. Vaporizing the propellants in the heat exchangers 10, 11 also has the effect of cooling the outer wall 12 of the propulsion chamber 5 that is heated by the heat produced by the propellants reacting in the propulsion chamber 5.

After the secondary flows of the two propellants under the control of the valves 16 have expanded in the turbines 8a, 9a, they are fed to the secondary thrusters 15. On the basis of external commands and/or of signals emitted by the various sensors, the control unit 17 controls the valves 16 to control the orientation of the vehicle propelled by the device 1.

Although the present invention is described with reference to a specific embodiment, it is clear that various modifications and changes can be made to this example without going beyond the general ambit of the invention as defined by the claims. For example, the secondary flows of the two propellants could be controlled only by valves downstream from the turbines, or only by valves upstream from the heat exchangers. Consequently, the description and the drawings should be considered in an illustrative sense rather than in a restrictive sense.

The invention claimed is:

1. A reaction propulsion device comprising: a main thruster including a propulsion chamber; a first feed circuit including a first turbopump including at least a first turbine coupled to a first pump, a first main line connected to the first pump downstream of the first pump that delivers a first propellant to the propulsion chamber of the main thruster, and a first branch-off from the first main line; and a second feed circuit including a second turbopump including at least a second turbine coupled to a second pump, a second main line connected to the second pump downstream of the second pump that delivers a second propellant to the propulsion chamber of the main thruster and a second branch-off from the second main line, wherein the propulsion chamber of the main thruster is a regenerative propulsion chamber, including a first heat exchanger and a second heat exchanger, wherein the first branch-off passes through the first heat exchanger and the first turbine of the first turbopump, and the second branch-off passes through the second heat exchanger and the second turbine of the second turbopump, and further comprising at least one secondary thruster connected to the first and second branch-offs downstream from the first and second turbines of the first and second turbopumps.

2. The reaction propulsion device according to claim 1, further comprising valves interposed between each of the first and second turbines and the at least one secondary thruster.

3. The reaction propulsion device according to claim 1, comprising a plurality of secondary thrusters connected downstream from each of the first and second turbines of the first and second turbopumps.

4. The reaction propulsion device according to claim 1, wherein the first heat exchanger and/or the second heat exchanger is/are incorporated in an outer wall of the propulsion chamber.

5. The reaction propulsion device according to claim 4, wherein the first and/or second heat exchanger incorporated in the outer wall of the propulsion chamber includes at least one propellant duct adjacent to an outer side of the wall.

6. A space launcher comprising at least one reaction propulsion device according to claim 1.

7. A propellant feed method for feeding propellants to a reaction propulsion device, the method comprising: delivering a first main flow of a first propellant to a propulsion chamber of a main thruster via a first main line of a first feed circuit in which the first propellant is pumped by a first pump of a first turbopump wherein the first main line is connected to the first pump downstream of the first pump; delivering a second main flow of a second propellant to the propulsion chamber of the main thruster via a second main line of a second feed circuit in which the second propellant is pumped by a second pump of a second turbopump wherein the second main line is connected to the second pump downstream of the second pump; diverting a first secondary flow of the first propellant via a first branch-off from the first main line carrying the main flow of the first propellant, heating the first secondary flow by the propulsion chamber of the main thruster in a first heat exchanger, and expanding the first secondary flow in a first turbine driving the first turbopump; diverting a second secondary flow of the second propellant via a second branch-off from the second main line carrying the main flow of the second propellant, heating the second secondary flow by the propulsion chamber of the main thruster in a second heat exchanger, and expanding the second secondary flow in a second turbine driving the second turbopump; and delivering the first and second secondary flows of the first and second propellants, after the secondary flows have expanded in the first and second turbines of the first and second turbopumps, to at least one secondary thruster.

8. The propellant feed method according to claim 7, wherein thrust from the at least one secondary thruster is used for steering.

9. The propellant feed method according to claim 7, wherein the propellant flows delivered to the at least one secondary thruster are regulated by valves interposed between each of the first and second turbines and the at least one secondary thruster.

10. The propellant feed method according to claim 7, wherein the first and/or second propellant is/are liquid upstream from the first and/or second heat exchanger, and gaseous downstream.

* * * * *